(12) United States Patent
McGuire et al.

(10) Patent No.: US 11,127,053 B2
(45) Date of Patent: Sep. 21, 2021

(54) SYSTEM, METHOD, AND COMPUTER PROGRAM PRODUCT FOR EVENT-BASED COMMUNICATION AND MESSAGING

(71) Applicant: Visa International Service Association, San Francisco, CA (US)

(72) Inventors: John McGuire, San Francisco, CA (US); Sameer Shiraz Poonja, Dubai (AE); Osman Alam, Dubai (AE); William Allan Gajda, Richmond (GB); Khaled Tlais, San Francisco, CA (US); Teemu Mattila, San Francisco, CA (US); Jake Jordan Butler, London (GB); Ranjiva Prasad, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 132 days.

(21) Appl. No.: 16/184,007

(22) Filed: Nov. 8, 2018

(65) Prior Publication Data

US 2019/0139105 A1 May 9, 2019

Related U.S. Application Data

(60) Provisional application No. 62/583,265, filed on Nov. 8, 2017.

(51) Int. Cl.
*G06Q 30/02* (2012.01)
*G06Q 20/32* (2012.01)

(52) U.S. Cl.
CPC ....... *G06Q 30/0281* (2013.01); *G06Q 20/322* (2013.01); *G06Q 30/0252* (2013.01); *G06Q 30/0261* (2013.01)

(58) Field of Classification Search
CPC .................................................. G06Q 30/0281
(Continued)

(56) References Cited

U.S. PATENT DOCUMENTS 9,310,205 B2 † 4/2016 Xu
9,654,240 B1 5/2017 Hoareau et al.
(Continued)

OTHER PUBLICATIONS

Event Based Mobile Social Network; Ahmedin, Mohammed. IEEE (Year: 2014).*

*Primary Examiner* — Bruce I Ebersman
*Assistant Examiner* — John A Anderson
(74) *Attorney, Agent, or Firm* — The Webb Law Firm

(57) ABSTRACT

Provided is a computer-implemented method for event-based communication and messaging that includes determining general event data associated with an event, determining user data associated with a user based on determining the event data associated with the event, determining pre-event data associated with the event, current event data associated with the event, or post-event data associated with the event based on the general event data associated with the event and the user data associated with the user, determining a current user location of the at least one user, generating at least one message based on the current user location, the at least one message including at least one of the following: pre-event data; current event data; post-event data; or any combination thereof; and communicating the at least one message to a user device of the user. A system and computer program product are also disclosed.

13 Claims, 6 Drawing Sheets

(58) Field of Classification Search
USPC .......................................................... 705/39
See application file for complete search history.

(56) References Cited

U.S. PATENT DOCUMENTS

| | | | |
|---|---|---|---|
| 9,864,778 B1* | 1/2018 | Strand | H04L 67/306 |
| 10,028,091 B2† | 7/2018 | Sahadi | |
| 10,095,987 B2† | 10/2018 | Zamer | |
| 2014/0046802 A1† | 2/2014 | Hosein | |
| 2014/0343994 A1† | 11/2014 | Graff | |
| 2015/0046711 A1* | 2/2015 | Slaby | H04W 12/0609 |
| | | | 713/170 |
| 2015/0235268 A1* | 8/2015 | Bell | G06Q 30/0261 |
| | | | 705/14.5 |
| 2015/0242889 A1 | 8/2015 | Zamer et al. | |
| 2015/0310486 A1 | 10/2015 | Hayes et al. | |
| 2016/0050520 A1* | 2/2016 | Stanger | G01S 5/0252 |
| | | | 455/456.3 |
| 2017/0039594 A1 | 2/2017 | Shaw et al. | |
| 2017/0243201 A1* | 8/2017 | Gustafsson | H04L 67/42 |
| 2018/0352378 A1* | 12/2018 | Sahadi | G06Q 50/14 |

\* cited by examiner
† cited by third party

SYSTEM, METHOD, AND COMPUTER PROGRAM PRODUCT FOR EVENT-BASED COMMUNICATION AND MESSAGING

CROSS REFERENCE TO RELATED APPLICATION

This application claims the benefit of U.S. Provisional Patent Application No. 62/583,265, filed on Nov. 8, 2017, the disclosure of which is hereby incorporated by reference in its entirety.

BACKGROUND

1. Field

This disclosure relates generally to communication platforms and, in one particular non-limiting embodiment, to a method, system, and computer program product for event-based communication and messaging regarding events associated with a specific physical venue.

2. Technical Considerations

Thousands of events, such as sporting events, performances, concerts, communal gatherings, conferences, meetings, and the like, occur on a daily basis throughout the world. These events may be held at a physical location called a venue. A goal of an owner and/or an operator of the venue, as well as an event organizer and/or a merchant, is to provide an attendee with a desirable user experience. By providing a positive experience, the attendee may be motivated to attend another similar event at the venue and the attendee may potentially recommend the venue, the event held at the venue, and/or a merchant associated with the venue, to another person. Accordingly, when the attendee's user experience is desirable, the popularity of the venue, the event, and/or a merchant may increase.

A venue may allow the attendee to obtain information about the venue on a user device of the attendee. For example, the venue may offer a free connection to a WiFi network to the attendee during the event so that the attendee can receive information about the venue. The information about the venue may include information about an event at the venue, maps and/or directories associated with facilities at the venue, maps and/or directories associated with merchants at the venue, and/or the like. For example, the venue may install multiple beacons that passively or actively broadcast information that can be received by the user device of the attendee.

However, the venue may be limited with regard to providing a user experience to the attendee during the event (e.g., when the attendee is located at the venue). For example, the attendee may not be provided information associated with a user experience when the attendee is not located at the venue, including information associated with pre-event activities and interactions and/or post-event activities and interactions. Further, while at the venue, there may be opportunities for enhancing the user experience with respect to communications, social interactions, merchant transactions, navigation, recommendations, and the like.

SUMMARY

Accordingly, and generally, provided is an improved method, system, and computer program product for event-based communication and messaging that overcome some or all of the deficiencies.

According to a non-limiting embodiment, provided is a computer-implemented method for event-based communication and messaging. The method comprises determining, with at least one processor, general event data associated with an event, wherein the general event data comprises at least one of the following: event time data; event venue data; event merchant data; or any combination thereof; determining, with at least one processor, user data associated with a user based on determining the event data associated with the event; determining, with at least one processor, pre-event data associated with the event, current event data associated with the event, or post-event data associated with the event based on the general event data associated with the event and the user data associated with the user; determining, with at least one processor, a current user location of the at least one user; generating, with at least one processor, at least one message based on the current user location, the at least one message comprising at least one of the following: pre-event data; current event data; post-event data; or any combination thereof; and communicating, with at least one processor, the at least one message to a user device of the at least one user.

According to another non-limiting embodiment, provided is a system for event-based communication and messaging. The system comprises at least one processor programmed or configured to determine general event data associated with an event, wherein the general event data comprises at least one of the following: event time data; event venue data; event merchant data; or any combination thereof; determine user data associated with a user based on determining the event data associated with the event; determine pre-event data associated with the event, current event data associated with the event, or post-event data associated with the event based on the general event data associated with the event and the user data associated with the user; determine a current user location of the at least one user; generate at least one message based on the current user location, the at least one message comprising at least one of the following: pre-event data, current event data, post-event data, or any combination thereof; and communicate the at least one message to a user device of the at least one user.

According to a further non-limiting embodiment, provided is a computer program product for event-based communication and messaging. The computer program product comprises at least one non-transitory computer-readable medium including one or more instructions that, when executed by at least one processor, cause the at least one processor to determine general event data associated with an event, wherein the general event data comprises at least one of the following: event time data; event venue data; event merchant data; or any combination thereof; determine user data associated with a user based on determining the event data associated with the event; determine pre-event data associated with the event, current event data associated with the event, or post-event data associated with the event based on the general event data associated with the event and the user data associated with the user; determine a current user location of the user; generate at least one message based on the current user location, the at least one message comprising at least one of the following: pre-event data; current event data; post-event data; or any combination thereof; and communicate the at least one message to a user device of the at least one user.

Further embodiments or aspects are set forth in the following numbered clauses:

Clause 1: A computer-implemented method for event-based communication and messaging that comprises determining, with at least one processor, general event data associated with an event, wherein the general event data comprises at least one of the following: event time data; event venue data; event merchant data; or any combination thereof; determining, with at least one processor, user data associated with a user based on determining the event data associated with the event; determining, with at least one processor, pre-event data associated with the event, current event data associated with the event, or post-event data associated with the event based on the general event data associated with the event and the user data associated with the user; determining, with at least one processor, a current user location of the at least one user; generating, with at least one processor, at least one message based on the current user location, the at least one message comprising at least one of the following: pre-event data; current event data; post-event data; or any combination thereof; and communicating, with at least one processor, the at least one message to a user device of the at least one user.

Clause 2: The method of clause 1, further comprising: receiving a registration request from the user comprising the user data; and based at least partially on the user data, building, with at least one processor, a user profile of the user.

Clause 3: The method of clauses 1 or 2, further comprising: determining linking data between a plurality of user profiles associated with a plurality of users; based at least partially on linking data, segmenting the plurality of user profiles into a group; and establishing a communication connection between a respective user device of at least two of the plurality of users.

Clause 4: The method of any of clauses 1-3, further comprising: based at least partially on current user location data associated with a current location of the user, determining at least one route between the current location of the user and a location in the venue of the event.

Clause 5: The method of any of clauses 1-4, wherein the location in the venue is one of a plurality of similar locations in the venue, wherein the method further comprises: determining a preferred location of the plurality of similar locations.

Clause 6: The method of any of clauses 1-5, wherein determining the preferred location of the plurality of similar locations is based at least partially on heat map data.

Clause 7: The method of any of clauses 1-6, further comprising: receiving a registration request from at least one merchant associated with at least one of the following: the at least one event; at least one venue; or any combination thereof; and based at least partially on the merchant data, building a merchant profile.

Clause 8: A system for event-based communication and messaging, the system comprising: at least one processor programmed or configured to: determine general event data associated with an event, wherein the general event data comprises at least one of the following: event time data; event venue data; event merchant data; or any combination thereof; determine user data associated with a user based on determining the event data associated with the event; determine pre-event data associated with the event, current event data associated with the event, or post-event data associated with the event based on the general event data associated with the event and the user data associated with the user; determine a current user location of the at least one user; generate at least one message based on the current user location, the at least one message comprising at least one of the following: pre-event data; current event data; post-event data; or any combination thereof; and communicate the at least one message to a user device of the user.

Clause 9: The system of clause 8, wherein the at least one processor is further programmed or configured to: receive a user request comprising merchant data, and wherein the at least one processor, when generating the at least one message, is programmed or configured to: generate the at least one message based on the user request.

Clause 10: The system of clauses 8 or 9, wherein the user request comprises at least one of the following: a delivery request; a request for merchandise; a request for services; a request for goods; a request for assistance; a request for information; or any combination thereof.

Clause 11: The system of any of clauses 8-10, wherein the at least one processor is further programmed or configured to: determine at least one specified payment method based at least partially on user payment method data included in the user request; and communicating a payment transaction request to at least one merchant system, the payment transaction request comprising transaction data associated with a payment transaction and data associated with the at least one specified payment method.

Clause 12: The system of any of clauses 8-11, wherein the at least one processor is further programmed or configured to: cause to display on a user device associated with the user, a list of a plurality of available payment methods; and receive a selection of the at least one specified payment method of the plurality of available payment methods.

Clause 13: The system of any of clauses 8-12, wherein the at least one processor, when generating the message, is programmed or configured to: generate the at least one message based on user profile data comprising user transaction data.

Clause 14: The system of any of clauses 8-13, wherein the at least one processor is further programmed or configured to: receive biometric data associated with a biometric of the user, and wherein the at least one processor, when generating the message, is programmed or configured to: generate the message based at least partially on the biometric data.

Clause 15: A computer program product for event-based communication and messaging, the computer program product comprising at least one non-transitory computer-readable medium including one or more instructions that, when executed by at least one processor, cause the at least one processor to: determine general event data associated with an event, wherein the general event data comprises at least one of the following: event time data; event venue data; event merchant data; or any combination thereof; determine user data associated with a user based on determining the general event data associated with the event; determine pre-event data associated with the event, current event data associated with the event, or post-event data associated with the event based on the general event data associated with the event and the user data associated with the user; determine a current user location of the user; generate at least one message based on the current user location, the at least one message comprising at least one of the following: pre-event data; current event data; post-event data; or any combination thereof; and communicate the at least one message to a user device of the user.

Clause 16: The computer program product of clause 15, wherein the one or more instructions further cause the at least one processor to: receive a registration request from the user comprising the user data; and build a user profile of the user based at least partially on the user data.

Clause 17: The computer program product of clauses 15 or 16, wherein the one or more instructions further cause the at least one processor to: determine linking data between a plurality of user profiles associated with a plurality of users;

segment the plurality of user profiles into a group based at least partially on linking data; and establish a communication connection between a respective user device of at least two of the plurality of users.

Clause 18: The computer program product of any of clauses 15-17, wherein the one or more instructions further cause the at least one processor to: determine at least one route between a current location of the user and a location in the venue of the event.

Clause 19: The computer program product of any of clauses 15-18, wherein the one or more instructions, which cause the at least one processor to determine the at least one route, cause the at least one processor to: determine the at least one route between the current location of the user and the location in the venue of the event based on a distance between the current location of the user and the location in the venue.

Clause 20: The computer program product of any of clauses 15-19, wherein the one or more instructions further cause the at least one processor to: cause to display on a user device associated with the user, a map of the venue that includes the at least one route between the current location of the user and the location in the venue.

The features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DETAILED DESCRIPTION

Figure 1:
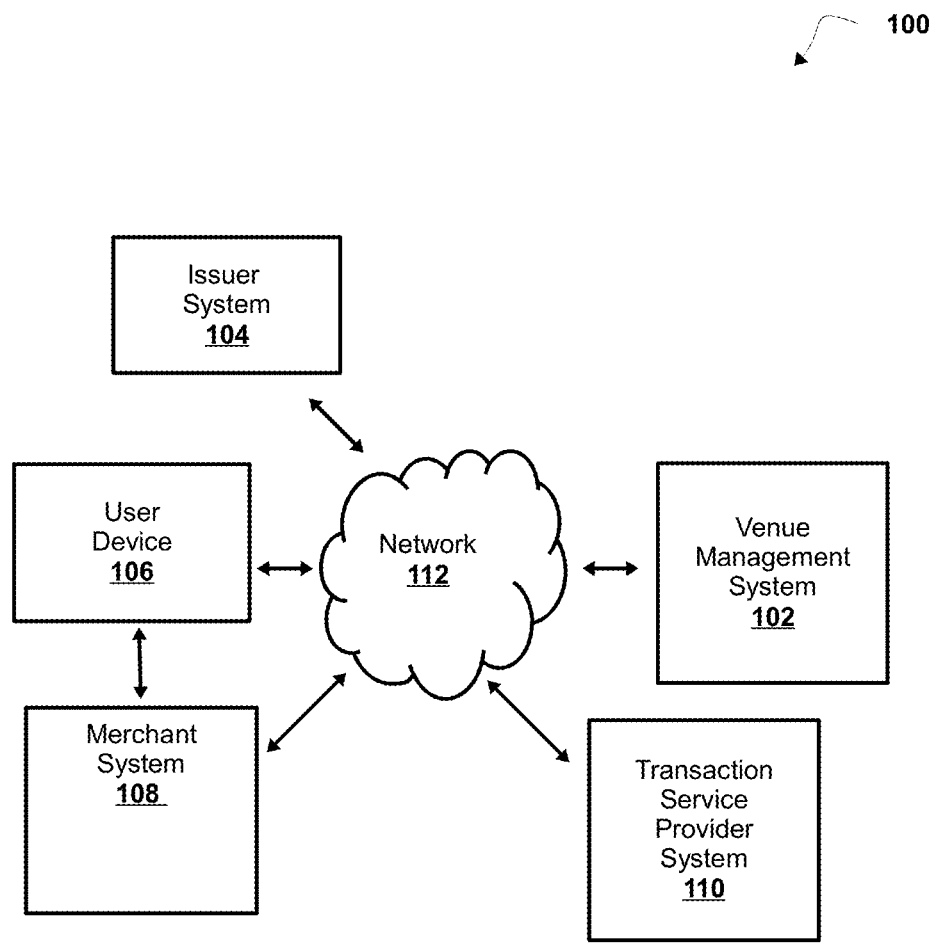
FIG. 1 is a diagram of a non-limiting embodiment of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least in partially on" unless explicitly stated otherwise.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the terms "issuer institution," "issuer," or "issuer bank" may refer to one or more entities that provide one or more accounts to a user (e.g., customer, consumer, and/or the like) for conducting transactions, such as credit card payment transactions and/or debit card payment transactions. For example, an issuer institution may provide an account identifier, such as a primary account number (PAN), to a user that uniquely identifies one or more accounts associated with the user (e.g., one or more accounts associated with a payment device of the user). The account identifier may be embodied on a payment device, such as a physical financial instrument (e.g., a payment card, an electronic payment card, a credit card, a debit card, and/or the like), and/or may be electronic and used for electronic payment transactions. In some non-limiting embodiments, an issuer institution may be associated with a bank identification number (BIN) that uniquely identifies the issuer institution. As used herein "issuer system" may refer to one or more computer systems operated by or on behalf of an issuer institution, such as a server computer executing one or more software applications. For example, an issuer system may include one or more authorization servers for authorizing a payment transaction.

As used herein, the term "account identifier" may refer to one or more types of identifiers associated with a user account (e.g., an account identifier, a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a payment device, a payment card, a credit card, a debit card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable payment device" may refer to a payment card (e.g., a credit or debit card), a gift card, a smartcard, smart media, a payroll card, a healthcare card, a wristband, a machine-readable medium containing account information, a keychain device or fob, a radio-frequency identification (RFID) transponder, a retailer discount or loyalty card, and/or the like. In some non-limiting embodiments, the portable payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the term "merchant" may refer to one or more entities (e.g., operators of retail businesses) that provide goods (e.g., food, merchandise, and/or the like) and/or services, and/or access to goods and/or services, to a user based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, RFID receivers, and/or other contactless transceivers or receivers, contact-based receivers, payment terminals, computers, servers, input devices, and/or the like.

As used herein, the term "POS system" may refer to one or more computers and/or peripheral devices used by a merchant to conduct a transaction. For example, a POS system may include one or more POS devices, and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives authorization request messages for payment transactions from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the terms "client" and "client device" may refer to one or more computing devices, such as processors, storage devices, and/or similar computer components, that access a service made available by a server. In some non-limiting embodiments, the term "client device" may refer to one or more devices that facilitate payment transactions, such as POS devices and/or POS systems used by a merchant. In some non-limiting embodiments, a client device may be any electronic device configured to communicate with one or more networks and/or initiate or facilitate transactions such as, but not limited to, one or more computers, portable computers (e.g., tablet computers), mobile devices (e.g., cellular phones, smartphones, wearable devices, such as watches, glasses, lenses, and/or clothing, PDAs, and/or the like), and/or other like devices. Moreover, the term "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components, that communicate with client devices and/or other computing devices over a network, such as the Internet or private networks and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present invention are directed to methods, systems, and computer program products for providing event-based communication and messaging platforms and/or services. In some non-limiting embodiments, a computer-implemented method for event-based communication and messaging includes determining, with at least one processor, general event data associated with an event. In some non-limiting embodiments, the general event data comprises at least one of the following: event time data; event venue data; event merchant data; or any combination thereof. The method may further include determining, user data associated with a user based on determining the event data associated with the event, determining pre-event data associated with the event, current event data associated with the event, or post-event data associated with the event based on the general event data associated with the event and the user data associated with the user, determining a current user location of the at least one user, and generating at least one message based on the current user location. In some non-limiting embodiments, the at least one message may include at least one of the following: pre-event data; current event data; post-event data; or any combination thereof. The method may further include communicating the at least one message to a user device of the user.

In this way, non-limiting embodiments of the disclosure provide an attendee with information associated with an event such that a user experience of the attendee is enhanced as compared to a user experience of the attendee when a pre-event data, current event data, and/or post-event data is not provided to the attendee. For example, while at the venue, the user experience may be enhanced with respect to communications, social interactions, merchant transactions, navigation, recommendations, and/or the like. In addition, non-limiting embodiments of the disclosure provide for event-based communication and messaging that may be independent of additional systems that would otherwise be necessary. For example, the use of network resources associated with a merchant system, an issuer system, and/or transaction service provider system may be reduced by offloading communication and messaging process from these systems to a central, venue management system prior to, during, and/or after an event at a venue.

FIG. 1 is a diagram of an example environment 100 in which devices, systems, and/or methods, described herein, may be implemented. As shown in FIG. 1, environment 100 includes venue management system 102, issuer system 104, user device 106, merchant system 108, transaction service provider system 110, and network 112.

Venue management system 102 may include one or more devices capable of receiving information from and/or communicating information to issuer system 104, user device 106, merchant system 108, and/or transaction service provider system 110 via network 112. For example, venue management system 102 may include a computing device, such as a server (e.g., a transaction processing server), a group of servers, and/or other like devices. In some non-limiting embodiments, venue management system 102 may be associated with a transaction service provider as described herein. In some non-limiting embodiments, venue management system 102 may communicate information to user device 106 via an application stored on user device 106 that is associated with venue management system 102. For example, venue management system 102 may communicate information to user device 106 via a mobile application (e.g., a mobile device application, a native application for a mobile device, a mobile cloud application for a mobile device, and/or the like) stored on user device 106. In some non-limiting embodiments, venue management system 102 may cause user device 106 to perform an action, such as displaying information, based on information communicated to user device 106 via the mobile application.

Issuer system 104 may include one or more devices capable of receiving information and/or communicating information to venue management system 102, user device 106, merchant system 108, and/or transaction service provider system 110 via network 112. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from and/or communicating information to venue management system 102, issuer system 104, merchant system 108, and/or transaction service provider system 110 via network 112. For example, user device 106 may include a client device and/or the like. In some non-limiting embodiments, user device 106 may or may not be capable of receiving information (e.g., from merchant system 108, from venue management system 102, from a remote system, and/or like) via a short range wireless communication connection (e.g., an NFC communication connection, an RFID communication connection, a Bluetooth® communication connection, and/or the like), and/or communicating information (e.g., to merchant system 108, to venue management system 102, to a remote system, and/or the like) via a short range wireless communication connection.

Merchant system 108 may include one or more devices capable of receiving information from and/or communicating information to venue management system 102, issuer system 104, user device 106, and/or transaction service provider system 110 via network 112. Merchant system 108 may also include a device capable of receiving information from user device 106 via network 112, a communication connection (e.g., an NFC communication connection, an RFID communication connection, a Bluetooth® communication connection, and/or the like) with user device 106, and/or the like, and/or communicating information to user device 106 via the network, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more user devices 106. For example, merchant system 108 may include user device 106 that allows a merchant to communicate information to transaction service provider system 110. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Transaction service provider system 110 may include one or more devices capable of receiving information from and/or communicating information to venue management system 102, issuer system 104, user device 106, and/or merchant system 108 via network 112. For example, transaction service provider system 110 may include a computing device, such as a server (e.g., a transaction processing server), a group of servers, and/or other like devices. In some non-limiting embodiments, transaction service provider system 110 may be associated with a transaction service provider as described herein. In some non-limiting embodiments, transaction service provider system 110 may be in communication with a data storage device, which may be local or remote to the transaction service provider system 110. In some non-limiting embodiments, transaction service provider system 110 may be capable of receiving information from, storing information in, communicating information to, or searching information stored in the data storage device. In some non-limiting embodiments, transaction service provider system 110 may include venue management system 102.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
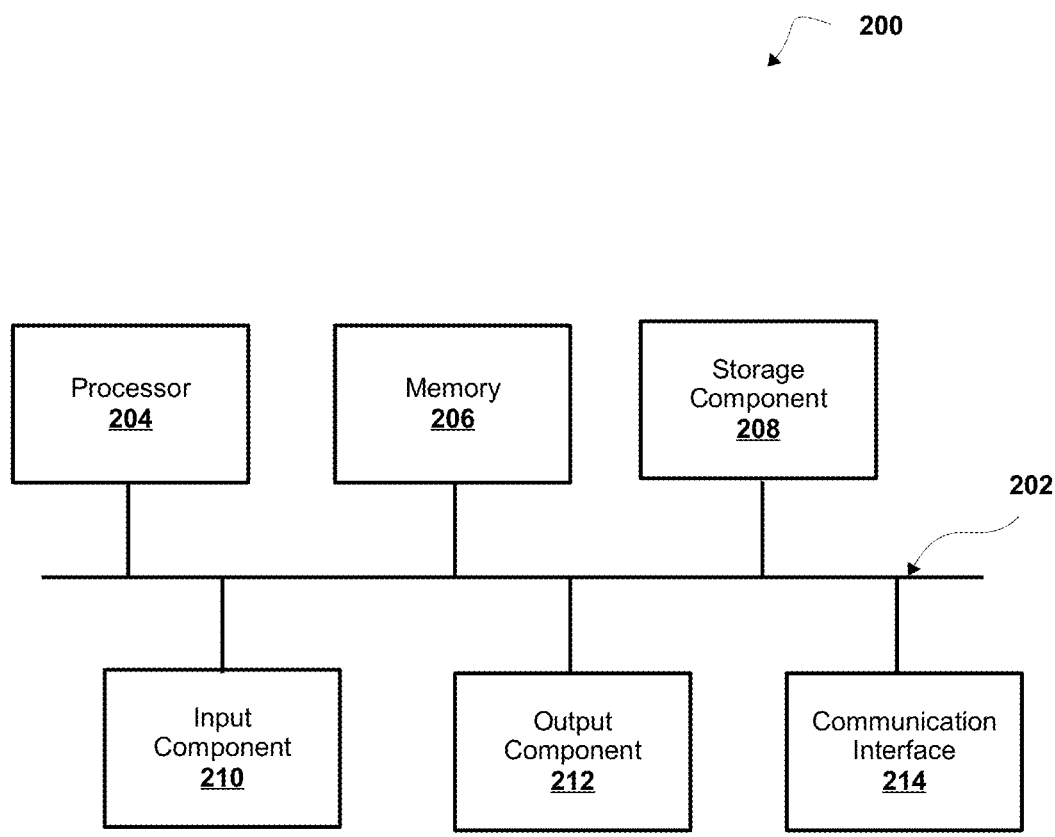
FIG. 2 is a diagram of a non-limiting embodiment of components of one or more devices of FIG. 1.

FIG. 2 is a diagram of example components of a device 200. Device 200 may correspond to one or more devices of venue management system 102, and/or one or more devices of issuer system 104, user device 106, one or more devices of merchant system 108, and/or one or more devices of transaction service provider system 110. In some non-limiting embodiments, venue management system 102, issuer system 104, user device 106, merchant system 108, and/or transaction service provider system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include a random access memory (RAM), a read only memory (ROM), and/or another type of dynamic or static storage device (e.g., a flash memory, a magnetic memory, an optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
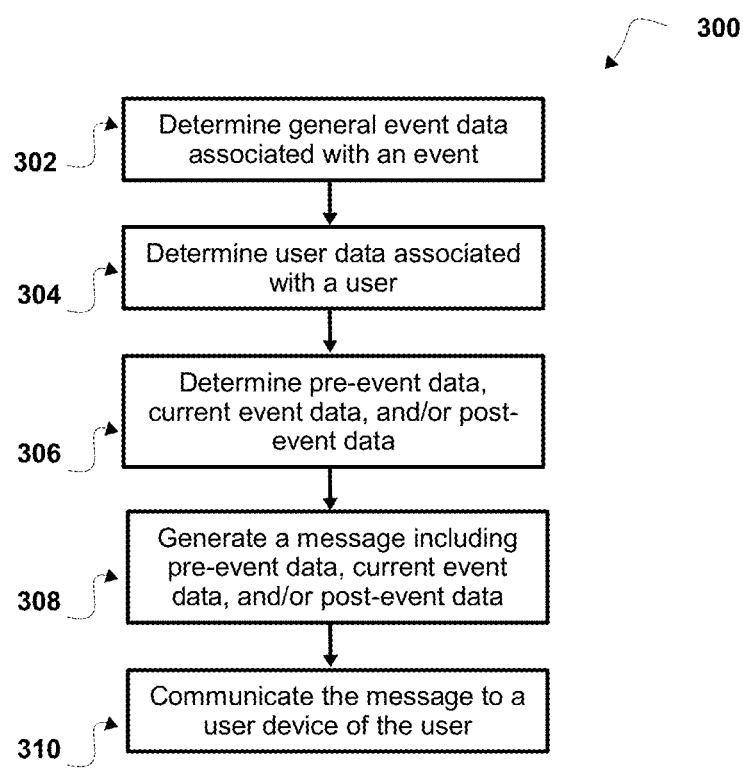
FIG. 3 is a flowchart illustrating a non-limiting embodiment of an event-based communication and messaging method according to the principles of the present invention.

Referring now to FIG. 3, FIG. 3 is a flowchart of a non-limiting embodiment of a process 300 for event-based communication and messaging. In some non-limiting embodiments, one or more of the steps of process 300 may be performed (e.g., completely, partially, etc.) by venue management system 102 (e.g., one or more devices of venue management system 102). In some non-limiting embodiments, one or more of the steps of process 300 may be performed (e.g., completely, partially, etc.) by another device or a group of devices separate from or including venue management system 102, such as issuer system 104 (e.g., one or more devices of issuer system 104), user device 106, merchant system 108 (e.g., one or more devices of merchant system 108), or transaction service provider system 110 (e.g., one or more devices of transaction service provider system 110).

As shown in FIG. 3, at step 302, process 300 includes determining general event data associated with an event. For example, venue management system 102 may determine general event data associated with an event held at a venue. In some non-limiting embodiments, general event data may include event attendance data associated with individuals attending an event (e.g., data associated with a list of individuals attending an event), event time data associated with a time of an event (e.g., data associated with a time at which an event starts, data associated with a time at which an event ends, data associated with a time interval between a time at which an event starts and a time at which an event ends, and/or the like), event venue data associated with a venue at which an event is located (e.g., data associated with a name of a venue at which an event is located, data associated with a location of a venue at which an event is located, and/or the like), event activity data (e.g., data associated with one or more activities that take place during an event), event merchant data (e.g., data associated with one or more merchants attending an event), and/or the like.

In some non-limiting embodiments, a venue may include a stadium, a field, an arena, a concert hall, a convention center, a hotel, a meeting place, and/or the like. In some non-limiting embodiments, the venue may include accommodations for a user attending an event at the venue to provide comfort and to allow the user to interact with venue management system 102 and/or other systems. For example, the venue may include a seat that is heated and that includes one or more USB interfaces. Additionally or alternatively, a seat may include an access point (e.g., a Wifi access point) assigned to and/or built into the seat. Additionally or alternatively, a user may be provided access to an area (e.g., a lounge) that offers goods and/or services to the user (e.g., based on a payment transaction involving tickets for an event, based on a loyalty account of the user, and/or the like).

As further shown in FIG. 3, at step 304, process 300 includes determining user data associated with a user. For example, venue management system 102 may determine user data associated with at least one user. In some non-limiting embodiments, the user data may include user identification data associated with an identification of a user (e.g., data associated with an identifier of a user, data associated with a device identifier of a user device of a user, and/or the like), user device data associated with a user device of a user (e.g., data associated with a device identifier of a user device of a user, data associated with a contact number of a user device of a user, and/or the like), user profile data associated with a user profile of a user (e.g., data associated with a user profile of a user, data associated with a user profile of a user for an event, and/or the like), user loyalty data associated with a loyalty account of a user (e.g., data associated with an identifier of a loyalty account of a user, data associated with a balance of loyalty points of a loyalty account of a user, and/or the like), user activity data associated with an activity of a user (e.g., data associated with an activity that a user indicated is of interest to the user), user location data associated with a location of a user (e.g., data associated with a location of a user device of a user, data associated with a current location of a user, and/or the like), and/or user payment account data associated with a payment account of a user.

In some non-limiting embodiments, venue management system 102 may receive a registration request from user device 106 of a user. For example, venue management system 102 may receive the registration request from user device 106 before or after determining general event data associated with an event. In some non-limiting embodiments, venue management system 102 may build a user profile associated with the user. For example, venue management system 102 may build the user profile associated with the user based on user data included in the registration request.

In some non-limiting embodiments, venue management system 102 may receive a registration request from merchant system 108 associated with a merchant that is attending an event held at a venue. For example, venue management system 102 may receive the registration request from merchant system 108 before or after determining the general event data associated with an event. In some non-limiting embodiments, venue management system 102 may build a merchant profile associated with a merchant. For example, venue management system 102 may build the merchant profile associated with the merchant based on merchant data included in the registration request.

In some non-limiting embodiments, venue management system 102 may determine linking data associated with a link between a plurality of users. For example, venue management system 102 may determine linking data associated with a link between the plurality of user profiles associated with the plurality of users based on receiving a registration request from a user of the plurality of users. In some non-limiting embodiments, linking data associated with a link between a plurality of users may include data associated with an attribute of a user, where the attribute is shared among a plurality of users. For example, linking data associated with a link between a plurality of users may include data associated with an attribute of a user included in a user profile of the user, where the attribute is shared among a plurality of user profiles of a plurality of users.

In some non-limiting embodiments, venue management system 102 may segment the plurality of user profiles into a group (e.g., a support group). For example, venue management system 102 may segment the plurality of user profiles into a group based on linking data associated with a link between a plurality of users. In some non-limiting embodiments, venue management system 102 may segment the plurality of user profiles into a group based on social networking credentials. For example, venue management system 102 may receive social networking credentials for a user and venue management system 102 may determine one or more other users that are associated with a social network of the user based on the social networking credentials. Venue management system 102 may segment one or more user profiles of the one or more other users into a group based on determining the one or more other users that are associated with the social network of the user. In some non-limiting embodiments, venue management system 102 may store payment method data associated with a payment method for each user (e.g., in a user profile for each user) of a group of users. In some non-limiting embodiments, venue management system 102 may store data associated with a loyalty account for a group of users.

As further shown in FIG. 3, at step 306, process 300 includes determining pre-event data, current event data, and/or post-event data. For example, venue management system 102 may determine the pre-event data, the current event data, and/or the post-event data. In some non-limiting embodiments, venue management system 102 may determine the pre-event data, the current event data, and/or the post-event data based on event time data and/or event venue data.

In some non-limiting embodiments, pre-event data, current event data, and/or post-event data may include venue entry/exit data associated with an entry and/or an exit of a venue at which an event is held (e.g., data associated with a location of an entry and/or an exit of a venue at which an event is held), ticket data associated with a ticket for accessing an event (e.g., data associated with a price of a ticket for accessing an event), weather data associated with weather conditions for an event (e.g., data associated with weather conditions near a venue at which an event is held), performer data associated with a performer at an event (e.g., data associated with an identifier of a performer at an event), team data associated with a team at an event (e.g., data associated with an identifier of a team at an event), group data associated with a group attending an event (e.g., data associated with a group of users attending an event, data associated with an identification of each user of a group of users attending an event, data associated with a location of a user of a group of users attending an event, and/or the like), transportation data associated with transportation at or around a venue at which an event is held (e.g., data associated with an estimate of time at which a mode of transportation may arrive at a venue, data associated with an estimate of time at which a mode of transportation may depart from a venue, and/or the like), recommendation data associated with a recommendation for a user attending an event (e.g., data associated with a recommendation of a merchant for a user attending an event, data associated with a recommendation of a merchant based on an offer for a user attending an event, and/or the like), navigation data associated with navigating a venue at which an event is held (e.g., data associated with a route to travel to a venue at which an event is held, data associated with a route inside of a venue at which an event is held, and/or the like), prediction data associated with a prediction for an outcome regarding an event (e.g., data associated with a prediction of a score for an event, data associated with a location of an activity in a venue at which an event is held, and/or the like), activity data associated with an activity of an event (e.g., data associated with a name of an activity of an event, data associated with a location of an activity in a venue at which an event is held, data associated with statistics for an activity that occurs during an event, and/or the like), bid data associated with a bid for a good and/or service associated with an event (e.g., data associated with a request for a bid from a user for a good and/or service associated with an event, data associated with one or more bids made by one or more individuals for a good and/or service associated with an event, and/or the like), survey data associated with a survey regarding the event (e.g., data associated with a survey conducted before, during, or after an event), contest data associated with a contest regarding the event (e.g., data associated with a contest, such as a quiz, conducted before, during, or after an event), social network data associated with a social network of a user (e.g., data associated with a social network of one or more users, data associated with a storyline generated by a social network of a user, and/or the like), and/or merchant data associated with a merchant that is attending an event (e.g., data associated with a name of a merchant that is attending an event, data associated with a location of a merchant in a venue at which an event is held, and/or the like).

Additionally or alternatively, pre-event data may include venue entry/exit data associated with an entry and/or an exit of a venue at which an event is going to be held (e.g., data associated with a location of an entry and/or an exit of a venue at which an event is going to be held), ticket data associated with a ticket for accessing an event prior to the event (e.g., data associated with a price of a ticket for accessing an event prior to the event), weather data associated with weather conditions prior to an event (e.g., data associated with weather conditions near a venue prior to a time when an event is held), performer data associated with a performer scheduled to be at an event (e.g., data associated with an identifier of a performer scheduled to be at an event), team data associated with a team scheduled to be at an event (e.g., data associated with an identifier of a team scheduled to be at an event), group data associated with a group scheduled to be attending an event (e.g., data associated with a group of users scheduled to be attending an event, data associated with an identification of each user of a group of users scheduled to be attending an event, data associated with a location of a user of a group of users scheduled to be attending an event, and/or the like), transportation data associated with transportation at or around a venue prior to a time at which an event is held (e.g., data associated with an estimate of time at which a mode of transportation may arrive at a venue prior to a time at which an event is held, data associated with an estimate of time at which a mode of transportation may depart from a venue prior to a time at which an event is held, and/or the like), recommendation data associated with a recommendation for a user scheduled to be attending an event (e.g., data associated with a recommendation of a merchant for a user scheduled to be attending an event, data associated with a recommendation of a merchant based on an offer for a user scheduled to be attending an event, and/or the like), navigation data associated with navigating a venue prior to a time at which an event is held (e.g., data associated with a route to travel to a venue prior to a time at which an event is held, data associated with a route inside of a venue prior to a time at which an event is held, and/or the like), prediction data associated with a prediction for an outcome regarding an event prior to a time at which an event is held (e.g., data associated with a prediction of a score for an event prior to a time at which an event is held, data associated with a location of an activity in a venue prior to a time at which an event is held, and/or the like), activity data associated with an activity of an event that is scheduled to be at the event (e.g., data associated with a name of an activity of an event that is scheduled to be at the event, data associated with a location of an activity that is scheduled to be in a venue at which an event is held, data associated with statistics for an activity that is scheduled to occur during an event, and/or the like), bid data associated with a bid for a good and/or service associated with an event prior to the event (e.g., data associated with a request for a bid from a user for a good and/or service associated with an event prior to the event, data associated with one or more bids made by one or more individuals for a good and/or service associated with an event prior to the event, and/or the like), survey data associated with a survey regarding the event prior to the event (e.g., data associated with a survey conducted before an event), contest data associated with a contest regarding the event prior to the event (e.g., data associated with a contest, such as a quiz, conducted before an event), social network data associated with a social network of a user prior to an event (e.g., data associated with a social network of one or more users prior to an event, data associated with a storyline generated by a social network of a user prior to an event, and/or the like), and/or merchant data associated with a merchant that is scheduled to attend an event (e.g., data associated with a name of a merchant that is scheduled to attend an event, data associated with a location of a merchant in a venue at which an event is held prior to the event, and/or the like).

Additionally or alternatively, current event data may include venue entry/exit data associated with an entry and/or an exit of a venue at which an event is currently being held (e.g., data associated with a location of an entry and/or an exit of a venue at which an event is currently being held), ticket data associated with a ticket for accessing an event during the event (e.g., ticket data associated with a price of a ticket for accessing an event during the event), weather data associated with weather conditions during an event (e.g., data associated with weather conditions near a venue at a time when an event is currently being held), performer data associated with a performer currently attending an event (e.g., data associated with an identifier of a performer currently attending an event), team data associated with a team currently attending an event (e.g., data associated with an identifier of a team currently attending an event), group data associated with a group currently attending an event (e.g., data associated with a group of users currently attending an event, data associated with an identification of each user of a group of users currently attending an event, data associated with a location of a user of a group of users scheduled to be attending an event, and/or the like), transportation data associated with transportation at or around a venue during an event (e.g., data associated with an estimate of time at which a mode of transportation may arrive at a venue during a time at which an event is currently being held, data associated with an estimate of time at which a mode of transportation may depart from a venue during a time at which an event is currently being held, and/or the like), recommendation data associated with a recommendation for a user currently attending an event (e.g., data associated with a recommendation of a merchant for a user currently attending an event, data associated with a recommendation of a merchant based on an offer for a user currently attending an event, and/or the like), navigation data associated with navigating a venue during an event (e.g., data associated with a route to travel to a venue during a time at which an event is currently being held, data associated with a route inside of a venue at which an event is currently being held, and/or the like), prediction data associated with a prediction for an outcome regarding an event during the event (e.g., data associated with a prediction of a score for an event during a time at which the event is currently being held, data associated with a location of an activity in a venue during a time at which an event is currently being held, and/or the like), activity data associated with an activity of an event during the event (e.g., data associated with a name of an activity of an event during the event, data associated with a location of an activity in a venue at which an event is held during the event, data associated with statistics for an activity during an event, and/or the like), bid data associated with a bid for a good and/or service associated with an event during the event (e.g., data associated with a request for a bid from a user for a good and/or service associated with an event during the event, data associated with one or more bids made by one or more individuals for a good and/or service associated with an event during the event, and/or the like), survey data associated with a survey regarding the event during the event (e.g., data associated with a survey conducted during an event), contest data associated with a contest regarding the event during the event (e.g., data associated with a contest, such as a quiz, conducted during an event), social network data associated with a social network of a user during an event (e.g., data associated with a social network of one or more users during an event, data associated with a storyline generated by a social network of a user during an event, and/or the like), and/or merchant data associated with a merchant that is currently attending an event (e.g., data associated with a name of a merchant that is currently attending an event, data associated with a location of a merchant in a venue at which an event is held during the event, and/or the like).

Additionally or alternatively, post-event data may include venue entry/exit data associated with an entry and/or an exit of a venue at which an event is held after the event (e.g., data associated with a location of an entry and/or an exit of a venue at which an event is held after the event), ticket data associated with a ticket for accessing an event after the event (e.g., ticket data associated with a price of a ticket for accessing an event after the event), weather data associated with weather conditions after an event (e.g., data associated with weather conditions near a venue at a time after an event is held), performer data associated with a performer that attended an event (e.g., data associated with an identifier of a performer that attended an event), team data associated with a team that attended an event (e.g., data associated with an identifier of a team that attended an event), group data associated with a group that attended an event (e.g., data associated with a group of users that attended an event, data associated with an identification of each user of a group of users that attended an event, data associated with a location of a user of a group of users that attended an event, and/or the like), transportation data associated with transportation at or around a venue after an event (e.g., data associated with an estimate of time at which a mode of transportation may arrive at a venue after a time at which an event is being held, data associated with an estimate of time at which a mode of transportation may depart from a venue after a time at which an event is being held, and/or the like), recommendation data associated with a recommendation for a user that attended an event (e.g., data associated with a recommendation of a merchant for a user that attended an event, data associated with a recommendation of a merchant based on an offer for a user that attended an event, and/or the like), navigation data associated with navigating a venue after an event (e.g., data associated with a route to travel to a venue after a time at which an event is held, data associated with a route inside of a venue after a time at which an event is held, and/or the like), activity data associated with an activity of an event after the event (e.g., data associated with a name of an activity of an event after the event, data associated with a location of an activity in a venue at which an event is held after the event, data associated with statistics for an activity after an event, and/or the like), bid data associated with a bid for a good and/or service associated with an event after the event (e.g., data associated with a request for a bid from a user for a good and/or service associated with an event after the event, data associated with one or more bids made by one or more individuals for a good and/or service associated with an event after the event, and/or the like), survey data associated with a survey regarding the event after the event (e.g., data associated with a survey conducted after an event), contest data associated with a contest regarding the event after the event (e.g., data associated with a contest, such as a quiz, conducted after an event), social network data associated with a social network of a user after an event (e.g., data associated with a social network of one or more users after an event, data associated with a storyline generated by a social network of a user after an event, and/or the like), and/or merchant data associated with a merchant that attended an event (e.g., data associated with a name of a merchant that attended an event, data associated with a location of a merchant in a venue at which an event is held after the event, and/or the like).

In some non-limiting embodiments, venue management system 102 may determine a route between a current location of the at least one user and a location in a venue of an event. For example, venue management system 102 may determine the route based on a current user location data associated with a current location of a user and venue location data associated with a location in the venue (e.g., a location of a merchant in the venue, a location of POS device of a merchant in the venue, and/or the like). Venue management system 102 may determine the route based on a distance (e.g., a shortest distance, a longest distance, an average distance, and/or the like) between the current location of the user (e.g., current location coordinates for the user, current seat identifier of the user, and/or the like) and the location in the venue. In some non-limiting embodiments, venue management system 102 may determine the route based on a queue associated with the location (e.g., a number of orders waiting to be filled at the location of a merchant in the venue, a number of individuals waiting in line at the location of a merchant in the venue, a number of individuals waiting in line at an exit location of the venue, a number of individuals waiting in line at an entrance location of the venue, a number of individuals waiting in line at an restroom location of the venue, and/or the like) in the venue. For example, venue management system 102 may determine a queue associated with each of a plurality of locations in the venue. Venue management system 102 may determine a location of the plurality of locations based on a queue of the location (e.g., based on the smallest queue of the plurality of locations, based on the largest queue of the plurality of locations, based on the queue of the location that satisfies a threshold, and/or the like). Venue management system 102 may determine the route based on determining the location. In some non-limiting embodiments, venue management system 102 may communicate heat map data associated with a heat map of a queue of a location in the venue. For example, venue management system 102 may generate heat map data associated with a heat map of a plurality of queues of a plurality of locations in the venue based on data associated with the plurality of queues of the plurality of locations. Venue management system 102 may communicate the heat map data associated with the heat map to user device 106 to cause user device 106 to display the heat map based on generating the heat map data associated with the heat map.

In some non-limiting embodiments, a location in a venue may include one of a plurality of similar locations in the venue. In some non-limiting embodiments, venue management system 102 may determine a preferred location in the venue out of a plurality of locations in a venue. For example, venue management system 102 may determine the preferred location of the plurality of similar locations based on pre-event data, current event data, and/or post-event data. In some non-limiting embodiments, venue management system 102 may determine the preferred location based on heat map data.

As further shown in FIG. 3, at step 308, process 300 includes generating a message including pre-event data, current event data, and/or post-event data. For example, venue management system 102 may generate a message that includes pre-event data, current event data, and/or post-event data. In some non-limiting embodiments, venue management system 102 may generate the at least one message based on determining the pre-event data, current event data, and/or post-event data.

In some non-limiting embodiments, venue management system 102 may determine user location data (e.g., location coordinates for the user, current seat identifier of the user, and/or the like) associated with a location of a user. For example, venue management system 102 may determine previous user location data, current user location data, and/or predicted user location data associated with the location of the user based on a user device data associated with user device 106 of the user. In some non-limiting embodiments, venue management system 102 may generate the at least one message based on the current user location data.

In some non-limiting embodiments, venue management system 102 may generate a message based upon a user request (e.g., an order from a user, a request for information from a user, and/or the like). For example, venue management system 102 may receive a user request from user device 106 that includes merchant data associated with a merchant. Venue management system 102 may generate a message to be communicated to merchant system 108 associated with the merchant based on the merchant data included in the user request. In some non-limiting embodiments, the user request may include data associated with goods and/or services provided by a merchant attending an event. In some non-limiting embodiments, the user request may be a request to purchase goods and/or services provided by a merchant attending an event. In some non-limiting embodiments, the user request may include user location data associated with a location of the user. In some non-limiting embodiments, the user request may include biometric data associated with a user. For example, the user request may include biometric authentication data associated with a biometric measurement of a user to be used during authorization of a payment transaction.

In some non-limiting embodiments, the user request may include a request for services of a merchant (e.g., a request for services of a merchant, a delivery request for delivery of services of a merchant, and/or the like), a request for goods of a merchant (e.g., a request for merchandise of a merchant, a delivery request for delivery of goods of a merchant, and/or the like), a request for assistance (e.g., a request for assistance from individuals associated with a venue, a request for assistance from individuals associated with an event, and/or the like), and/or a request for information (e.g., a request for information associated with an event, a request for information associated with a venue, and/or the like). In some non-limiting embodiments, venue management system 102 may determine a location of a user based on the user request. For example, venue management system 102 may determine a location of a user based on user location data included in the user request. Venue management system 102 may communicate data associated with the location of user to merchant system 108 (e.g., a POS device of merchant system 108) to allow for a merchant associated with merchant system 108 to deliver goods and/or services to the user at the location of the user.

In some non-limiting embodiments, venue management system 102 may receive a user request from user device 106 and venue management system 102 may use a machine learning engine to determine a response to the user request. In some non-limiting embodiments, venue management system 102 may communicate a message based upon the user request. For example, venue management system 102 may communicate the message to merchant system 108 associated with a merchant based upon merchant data associated with the merchant included in the user request. In some non-limiting embodiments, venue management system 102 may communicate a response message (e.g., a message including response data associated with a response to the user request) to the user request based on determining a response to the user request. In some non-limiting embodiments, the response message may include data associated with a status of a user request (e.g., tracking of a user request), data associated with an estimate of time to receive a good and/or service of merchant (e.g., an estimate of time to meet a ride service), data associated with a location to pick up a good and/or service of merchant (e.g., a location to meet a ride service), data associated with a prompt to have a user indicate that a good and/or service of a merchant is to be delivered to the user, data associated with a prompt to a user to provide a location at which a good and/or service of a merchant is to be delivered to the user, data associated with a route between a current location of the at least one user and a location in a venue of an event, and/or the like.

In some non-limiting embodiments, venue management system 102 may determine a specified payment method for a payment transaction. For example, venue management system 102 may determine at least one specified payment method associated with a user request. In some non-limiting embodiments, venue management system 102 may cause a list of a plurality of available payment methods to be displayed on a user device of a user. For example, venue management system 102 may cause a list of a plurality of available payment methods to be displayed on a user device of the user. In some non-limiting embodiments, venue management system 102 may determine a specified payment method for a payment transaction for each user of a group of users so that the payment transaction may be split amongst the group of users.

In some non-limiting embodiments, venue management system 102 may receive a selection of the at least one specified payment method of the plurality of available payment methods. For example, venue management system 102 may receive a selection of the at least one specified payment method from a user device (e.g., user device 106) of the at least one user. In some non-limiting embodiments, venue management system 102 may transmit a payment transaction request to merchant system 108 (e.g., merchant system 108 associated with a merchant at a venue at which an event is held). For example, venue management system 102 may transmit a payment transaction request to merchant system 108 that includes transaction data associated with a payment transaction and/or at least one specified payment method for a user involved in the payment transaction.

In some non-limiting embodiments, venue management system 102 may generate a message based on transaction data associated with one or more payment transactions involving one or more users. For example, venue management system 102 may determine that the one or more users is likely to conduct a payment transaction (e.g., using a machine learning predictive engine) based on transaction data associated with one or more payment transactions involving one or more users. Venue management system 102 may generate a message based on determining that the one or more users is likely to conduct the payment transaction.

The message may be generated to be communicated to merchant system 108 to inform a merchant associated with merchant system 108 about the one or more users (e.g., about a propensity of the one or more users to conduct a payment transaction with the merchant associated with merchant system 108).

As further shown in FIG. 3, at step 310, process 300 includes communicating the message to a user device of the user. For example, venue management system 102 may communicate (e.g., in real-time) the message to user device 106 of the user. In some non-limiting embodiments, venue management system 102 may communicate the message to user device 106 of the user based on an event. For example, venue management system 102 may communicate the message to user device 106 of the user during the event based on an activity associated with the event during the event. In some non-limiting embodiments, venue management system 102 may communicate the message to user device 106 of the user based on a payment transaction conducted during the event. For example, venue management system 102 may communicate the message to user device 106 of the user based on the user conducting the payment transaction during the event, where the message include transaction data associated with the payment transaction. Additionally or alternatively, the message may include data associated with tracking the goods and/or services included in the payment transaction (e.g., data associated with order tracking for the payment transaction). In some non-limiting embodiments, venue management system 102 may communicate the message via a text message, an email message, a push notification message (e.g., a real-time push notification message), a mobile application message, and/or the like.

In some non-limiting embodiments, venue management system 102 may facilitate communication between user device 106 of a user and at least one remote device and/or at least one remote system. For example, venue management system 102 may establish a communication connection between a plurality of user devices. In some non-limiting embodiments, venue management system 102 may establish a communication connection between user devices of a first plurality of users (e.g., at least two users) of a plurality of users (e.g., a plurality of user in a group). For example, venue management system 102 may establish a communication connection between user devices of at least two users of the plurality of users based on segmenting the plurality of users into a group based on a plurality of user profiles of the plurality of users.

In some non-limiting embodiments, venue management system 102 may establish a communication connection between a user device of a user and at least one remote system. For example, venue management system 102 may establish a communication connection between a user device of a user and the remote system. In some non-limiting embodiments, the remote system may include an event system, such as a system that stores, determines, and/or provides event data associated with an event. Additionally or alternatively, the at least one remote system may include a merchant system. For example, the at least one remote system may include a merchant system (e.g., merchant system 108) that includes a database that stores merchant data associated with a merchant. Additionally or alternatively, the at least one remote system includes a gambling system. For example, the at least one remote system includes the gambling system including a database that stores betting data associated with a betting activity for an event. In some non-limiting embodiments, the at least one remote system may include a streaming data system (e.g., a streaming video data system, a streaming audio data system, and/or the like). In some non-limiting embodiments, venue management system 102 may include the remote system.

In some non-limiting embodiments, venue management system 102 may generate and/or communicate a message based upon user profile data that includes user transaction data (e.g., user historical transaction data), user propensity data, user loyalty data, user behavior data, and/or demographic data. In some non-limiting embodiments, venue management system 102 may generate and/or communicate a message based on biometric data. For example, venue management system 102 may receive biometric data associated with a biometric of a user and venue management system 102 may communicate the message based on receiving the biometric data. In some non-limiting embodiments, the message may include the biometric data.

In some non-limiting embodiments, venue management system 102 may determine a reward (e.g., an amount of reward points, an offer to be used in a payment transaction, and/or the like) for an account (e.g., a loyalty account) of a user. For example, venue management system 102 may determine rewards for the account of the user based on actions by the user before, during, and/or after at event. In some non-limiting embodiments, venue management system 102 may determine a reward for the account of a user based on algorithm that allows the user to provide a reward to a cause chosen by the user. In some non-limiting embodiments, a reward for the account of the user may be provided (e.g., sponsored) by a merchant, an issuer institution, a transaction service provider, an operator of a venue, an entity associated with an event, and/or the like. In some non-limiting embodiments, venue management system 102 may process a reward for the account of the user. For example, venue management system 102 may apply the reward to a payment transaction involving the account of the user, apply the reward as a donation to a cause associated with the user, and/or the like.

Figure 4:
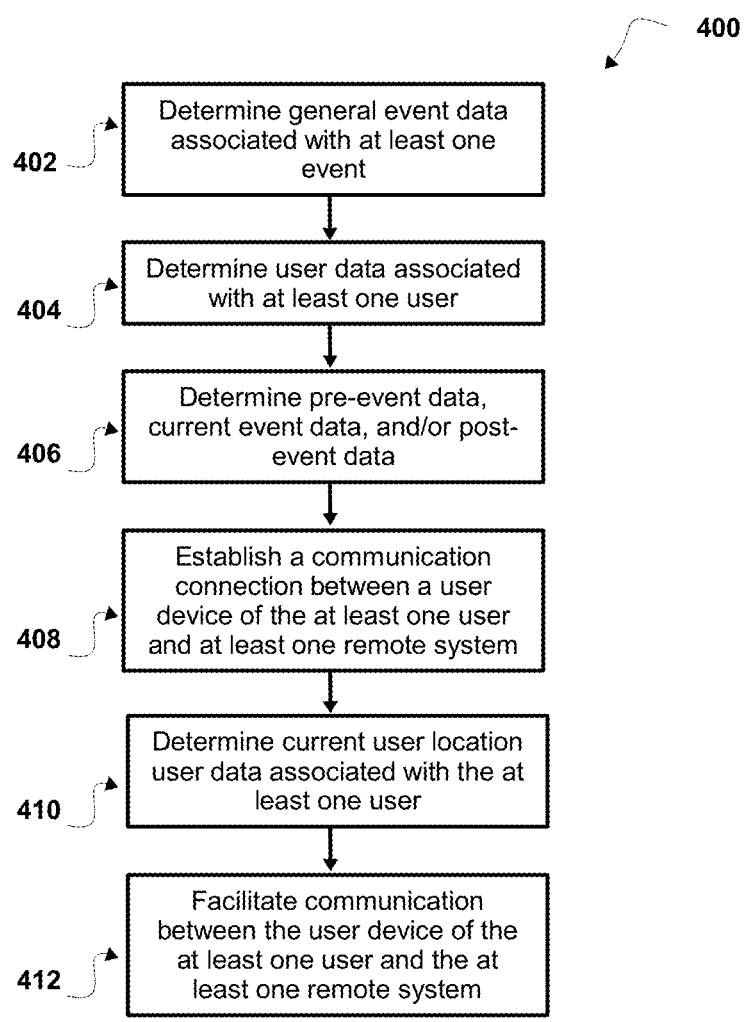
FIG. 4 is a flowchart illustrating a non-limiting embodiment of an event-based communication and messaging method according to the principles of the present disclosure.

Referring now to FIG. 4, FIG. 4 is a flowchart of a non-limiting embodiment of a process 400 for event-based communication and messaging. In some non-limiting embodiments, one or more of the steps of process 400 may be performed (e.g., completely, partially, etc.) by venue management system 102 (e.g., one or more devices of venue management system 102). In some non-limiting embodiments, one or more of the steps of process 400 may be performed (e.g., completely, partially, etc.) by another device or a group of devices separate from or including venue management system 102, such as issuer system 104 (e.g., one or more devices of issuer system 104), user device 106, merchant system 108 (e.g., one or more devices of merchant system 108), or transaction service provider system 110 (e.g., one or more devices of transaction service provider system 110).

As shown in FIG. 4, at step 402, process 400 includes determining general event data associated with at least one event. For example, venue management system 102 may determine event data associated with at least one event as described herein. As further shown in FIG. 4, at step 404, process 400 includes determining user data associated with at least one user. For example, venue management system 102 may determine user data associated with at least one user as described herein. As further shown in FIG. 4, at step 406, process 400 includes determining pre-event data, current event data, and/or post-event data. For example, venue management system 102 may determine the pre-event data, the current event data, and/or the post-event data as described herein. As further shown in FIG. 4, at step 408, process 400 includes establishing a communication connection between a user device of the at least one user and at least one remote system. For example, venue management system 102 may establish a communication connection between a user device of the at least one user and at least one remote system.

As further shown in FIG. 4, at step 410, process 400 includes determining current user location user data associated with the at least one user. For example, venue management system 102 may determine current user location user data associated with the at least one user as described herein. As further shown in FIG. 4, at step 412, process 400 includes facilitating communication between the user device of the at least one user and the at least one remote system. For example, venue management system 102 may facilitate communication between the user device of the at least one user and the at least one remote system as described herein.

Figure 5A:
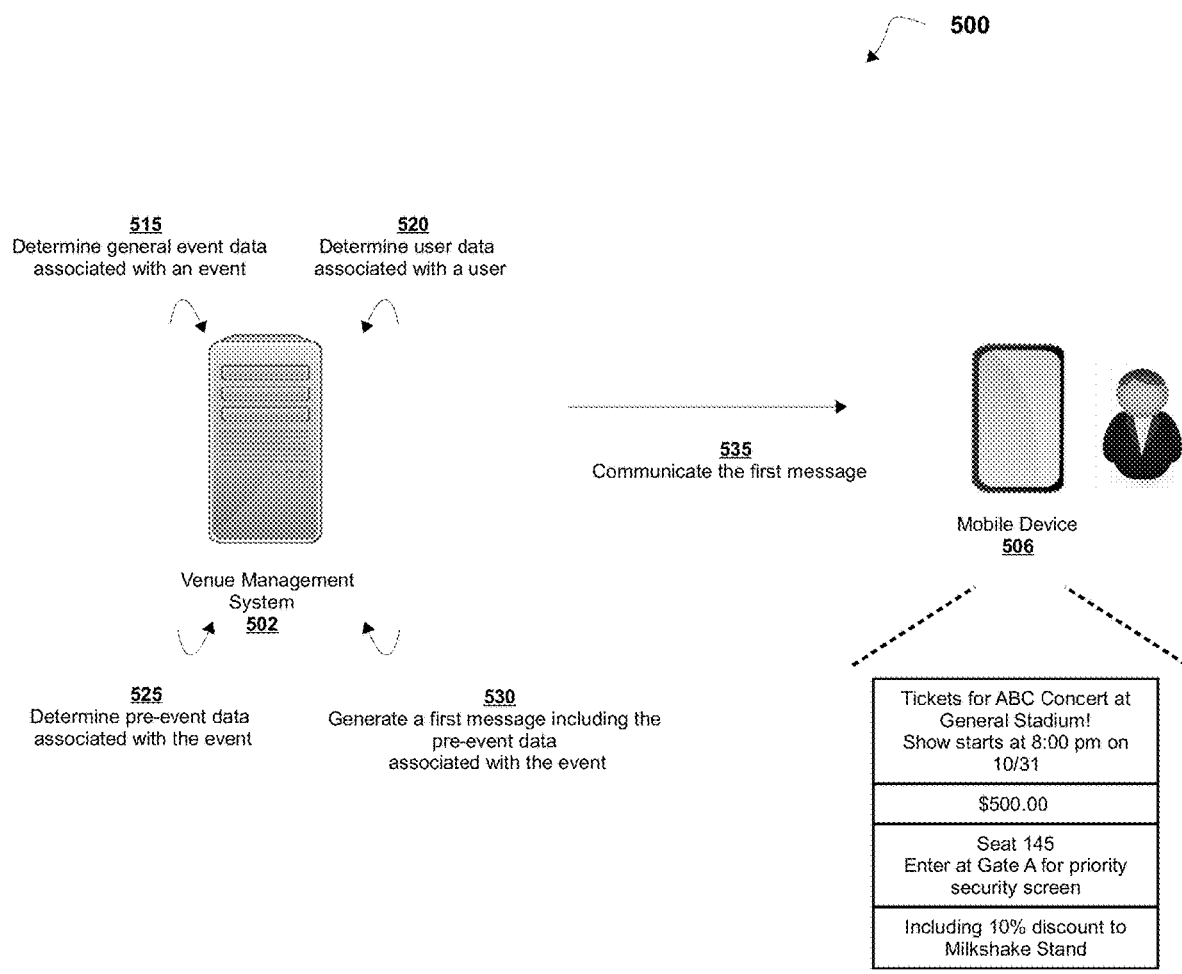
FIGS. 5A-5B are diagrams of an implementation of an event-based communication and messaging method.
Figure 5B:
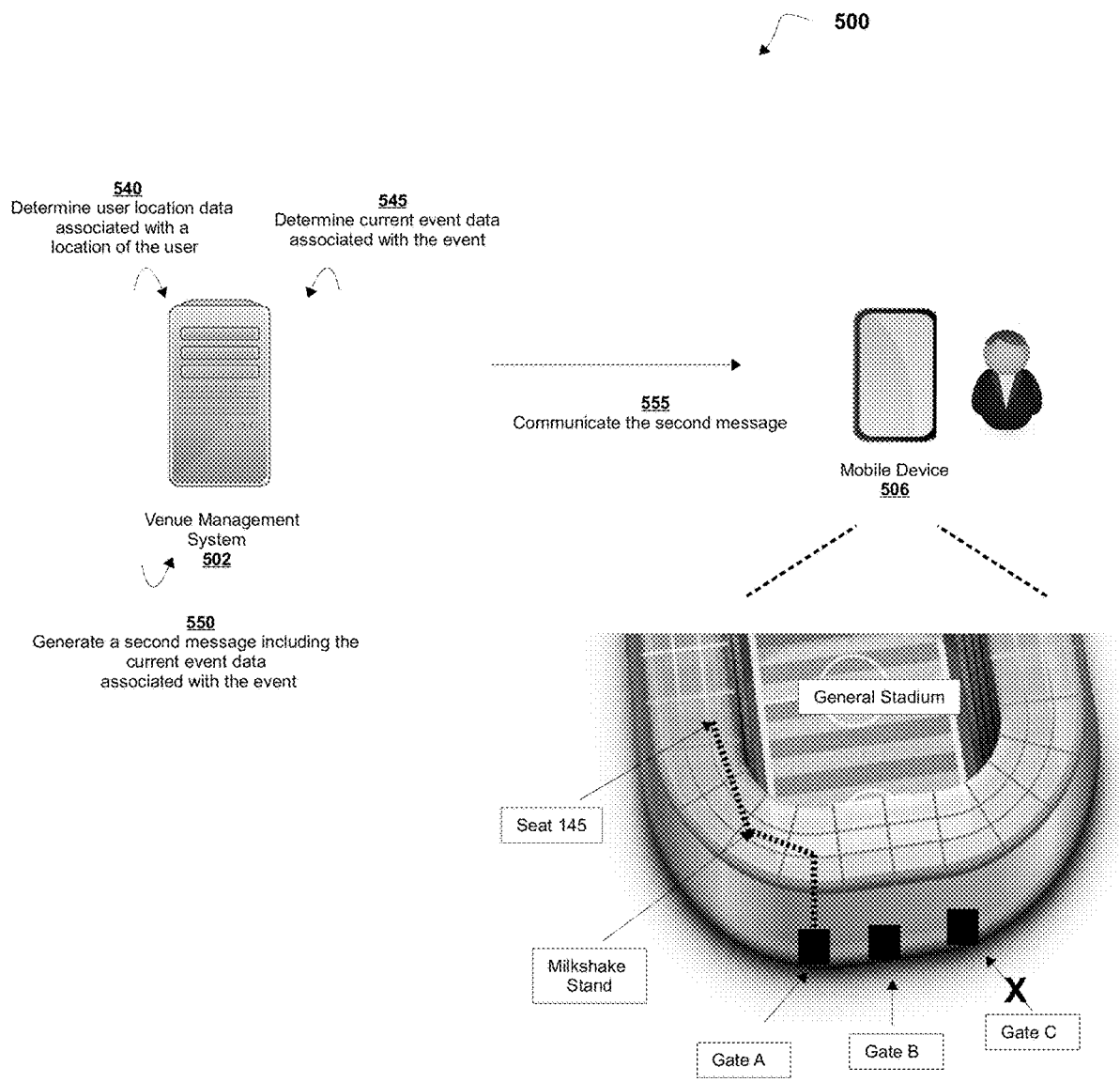

FIGS. 5A-5B are diagrams of an overview of a non-limiting embodiment of an implementation 500 relating to an event-based communication and messaging method. As shown in FIGS. 5A-5B, implementation 400 may include venue management system 502 and mobile device 506. In some non-limiting embodiments, venue management system 502 may be the same or similar to venue management system 102. In some non-limiting embodiments, mobile device 506 may be the same or similar to user device 106.

As shown by reference number 515 in FIG. 5A, venue management system 502 may determine general event data associated with an event. For example, venue management system 502 may determine event attendance data associated with individuals attending an event, event time data associated with a time of an event, and/or event venue data associated with a venue at which an event is located. As further shown by reference number 520 in FIG. 5A, venue management system 502 may determine user data associated with a user attending the event based on the general event data. For example, venue management system 502 may determine a device identifier of mobile device 506 of the user based on the event attendance data. In some non-limiting embodiments, venue management system 502 may determine a contact number of mobile device 506 based on the device identifier of mobile device 506.

As further shown by reference number 525 in FIG. 5A, venue management system 502 may determine pre-event data associated with the event. For example, venue management system 502 may determine venue entry/exit data associated with an entry and/or an exit of a venue at which an event is held, ticket data associated with a ticket for accessing an event, and/or data associated with a reward for an account of the user. As further shown by reference number 530 in FIG. 5A, venue management system 502 may generate a first message including the pre-event data based on determining the pre-event data. As further shown by reference number 535 in FIG. 5A, venue management system 502 may communicate the first message to mobile device 506 of the user.

As shown by reference number 540 in FIG. 5B, venue management system 502 may determine user location data associated with a location of the user. For example, venue management system 502 may determine user location data associated with the location of the user based on event time data associated with an event. In some non-limiting embodiments, venue management system 502 may determine user location data associated with the location of the user based on a threshold between a current time and a time at which the event is to begin. As further shown by reference number 545 in FIG. 5B, venue management system 502 may determine current event data associated with the event. For example, venue management system 502 may determine venue entry/exit data associated with an entry and/or an exit of a venue at which an event is currently being held, navigation data associated with navigating a venue during an event, and/or recommendation data associated with a recommendation for a user currently attending an event.

As further shown by reference number 550 in FIG. 5B, venue management system 502 may generate a second message including the current event data associated with the event. As further shown by reference number 555 in FIG. 5B, venue management system 502 may communicate the second message to mobile device 506. For example, venue management system 502 may communicate the second message to mobile device 506 via a mobile application stored on mobile device 506. In some non-limiting embodiments, the second message may cause mobile device 506 to display a map of the venue that includes data associated with a route inside of a venue at which the event is currently being held, data associated with a location of an entry and/or an exit of a venue at which the event is currently being held, data associated with a recommendation of a merchant based on an offer for a user that is attending the event, and/or predicted user location data associated with a predicted location of the user during the event.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for event-based communication and messaging, comprising:

receiving, with at least one processor, a registration request from a mobile device of a user attending an event, wherein the registration request comprises user device data associated with a mobile device of the user;

building, with at least one processor, a user profile of the user based on the user device data associated with the mobile device of the user;

determining, with at least one processor, general event data associated with the event, wherein the general event data comprises:
event time data;
event venue data; and
event merchant data;

determining, with at least one processor, the user device data associated with the mobile device of the user attending the event from the user profile of the user based on determining the general event data associated with the event;

determining, with at least one processor, venue entry/exit data associated with an entry and an exit of a venue at which the event is held based on the general event data associated with the event;

determining, with at least one processor, a current user location of the user;

receiving, with at least one processor, a user request from the mobile device of the user, wherein the user request comprises data associated with goods or services provided by a merchant attending the event;
receiving, with at least one processor, biometric data associated with a biometric of the user;
generating, with at least one processor, at least one message based on the current user location and the biometric data associated with the biometric of the user, the at least one message comprising:
current event data;
communicating, with at least one processor, the at least one message to the mobile device of the user based on the user device data associated with the mobile device of the user;
communicating, with at least one processor, heat map data associated with a heat map of a queue of a location of the merchant in the venue of the event to the mobile device of the user to cause the mobile device to display the heat map;
determining, with at least one processor, a preferred location of a plurality of similar locations in the venue of the event, wherein determining the preferred location of the plurality of similar locations is based at least partially on the heat map data associated with the heat map of the queue of the preferred location in the venue of the event;
determining, with at least one processor, at least one route between the current user location and the preferred location in the venue of the event based at least partially on current user location data associated with the current user location of the user; and
causing, with at least one processor, the mobile device of the user to display a map of the venue of the event that includes the at least one route between the current user location of the user and the location of the merchant in the venue of the event.

2. The method of claim 1, further comprising:
determining linking data between a plurality of user profiles associated with a plurality of users;
based at least partially on linking data, segmenting the plurality of user profiles into a group; and
establishing a communication connection between a respective user device of at least two of the plurality of users.

3. The method of claim 1, further comprising:
based at least partially on current user location data associated with the current user location of the user, determining at least one route between the current user location of the user and another location in the venue of the event.

4. The method of claim 1, further comprising:
receiving a registration request from the merchant attending the event, wherein the registration request comprises merchant data associated with the merchant; and
based at least partially on the merchant data, building a merchant profile.

5. A system for event-based communication and messaging, the system comprising:
at least one processor programmed or configured to:
receive a registration request from a mobile device of a user attending an event, wherein the registration request comprises user device data associated with a mobile device of the user;
build a user profile of the user based on the user device data associated with the mobile device of the user;
determine general event data associated with the event, wherein the general event data comprises:
event time data;
event venue data; and
event merchant data;
determine the user device data associated with the mobile device of the user attending the event from the user profile of the user based on determining the general event data associated with the event;
determine venue entry/exit data associated with an entry and an exit of a venue at which the event is held based on the general event data associated with the event;
determine a current user location of the user;
receive a user request from the mobile device of the user, wherein the user request includes data associated with goods or services provided by a merchant attending the event;
receive biometric data associated with a biometric of the user;
generate at least one message based on the current user location and the biometric data associated with the biometric of the user, the at least one message comprising:
current event data;
communicate the at least one message to the mobile device of the user based on the user device data associated with the mobile device of the user;
communicate heat map data associated with a heat map of a queue of a location of the merchant in the venue of the event to the mobile device of the user to cause the mobile device to display the heat map;
determine a preferred location of a plurality of similar locations in the venue of the event, wherein when determining the preferred location of the plurality of similar locations, the at least one processor is programmed or configured to:
determine the preferred location of the plurality of similar locations based at least partially on the heat map data associated with the heat map of the queue of the preferred location in the venue of the event;
determine at least one route between the current user location of the user and the preferred location in the venue of the event based at least partially on current user location data associated with the current user location of the user; and
cause the mobile device of the user to display a map of the venue of the event that includes the at least one route between the current user location of the user and the location of the merchant in the venue of the event.

6. The system of claim 5, wherein the user request comprises at least one of the following: a delivery request; a request for merchandise; a request for services; a request for goods; a request for assistance; a request for information; or any combination thereof.

7. The system of claim 5, wherein the at least one processor is further programmed or configured to:
determine at least one specified payment method based at least partially on user payment method data included in the user request; and
communicating a payment transaction request to at least one merchant system, the payment transaction request comprising transaction data associated with a payment transaction and data associated with the at least one specified payment method.

8. The system of claim 7, wherein the at least one processor is further programmed or configured to:
cause to display on the mobile device of the user, a list of a plurality of available payment methods; and receive a selection of the at least one specified payment method of the plurality of available payment methods.

9. The system of claim 5, wherein the at least one processor, when generating the at least one message, is programmed or configured to:
generate the at least one message based on user profile data comprising user transaction data.

10. A computer program product for event-based communication and messaging, the computer program product comprising at least one non-transitory computer-readable medium including one or more instructions that, when executed by at least one processor, cause the at least one processor to:
receive a registration request from a mobile device of a user attending an event, wherein the registration request comprises user device data associated with the mobile device of the user;
build a user profile of the user based on the user device data associated with the mobile device of the user;
determine general event data associated with the event, wherein the general event data comprises:
event time data;
event venue data; and
event merchant data;
determine the user device data associated with the mobile device of the user attending the event from the user profile of the user based on determining the general event data associated with the event;
determine venue entry/exit data associated with an entry and an exit of a venue at which the event is held based on the general event data associated with the event;
determine a current user location of the user;
receive a user request from the mobile device of the user, wherein the user request includes data associated with goods or services provided by a merchant attending the event;
receive biometric data associated with a biometric of the user, and
generate at least one message based on the current user location and the biometric data associated with the biometric of the user, the at least one message comprising:
current event data;
communicate the at least one message to the mobile device of the user based on the user device data associated with the mobile device of the user;
communicate heat map data associated with a heat map of a queue of a location of the merchant in the venue of the event to the mobile device of the user to cause the mobile device to display the heat map;
determine a preferred location of a plurality of similar locations in the venue of the event, wherein when determining the preferred location of the plurality of similar locations, the at least one processor is programmed or configured to:
determine the preferred location of the plurality of similar locations based at least partially on the heat map data associated with the heat map of the queue of the preferred location in the venue of the event;
determine at least one route between the current user location of the user and the preferred location in the venue of the event based at least partially on current user location data associated with the current user location of the user; and
cause the mobile device of the user to display a map of the venue of the event that includes the at least one route between the current user location of the user and the location of the merchant in the venue of the event.

11. The computer program product of claim 10, wherein the one or more instructions further cause the at least one processor to:
determine linking data between a plurality of user profiles associated with a plurality of users;
segment the plurality of user profiles into a group based at least partially on linking data; and
establish a communication connection between a respective user device of at least two of the plurality of users.

12. The computer program product of claim 10, wherein the one or more instructions, which cause the at least one processor to determine the at least one route, cause the at least one processor to:
determine the at least one route between the current user location of the user and the preferred location in the venue of the event based on a distance between the current user location of the user and the location in the venue of the event.

13. The computer program product of claim 12, wherein the one or more instructions further cause the at least one processor to:
cause to display on the mobile device associated with the user, a map of the venue of the event that includes the at least one route between the current user location of the user and the preferred location in the venue of the event.

* * * * *